Jan. 5, 1937.                D. F. KRONQUIST                2,066,982
                              REAR VISION MIRROR
                              Filed Oct. 11, 1934
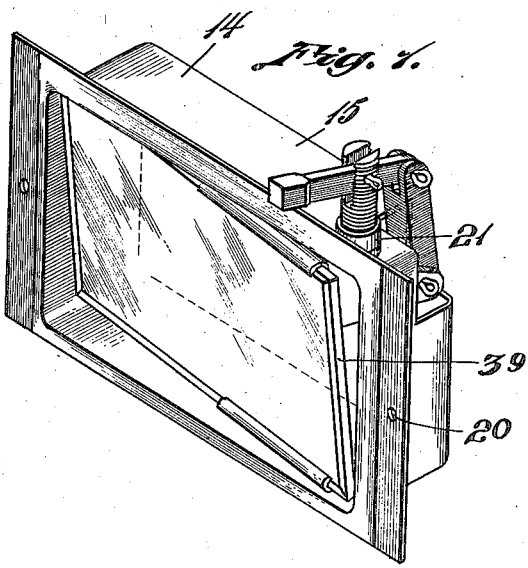
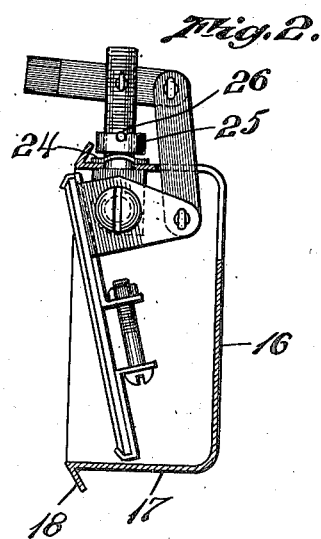
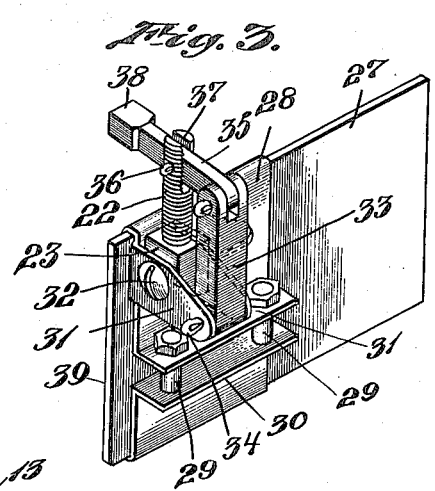
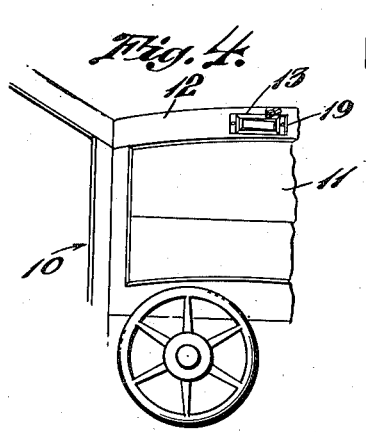
INVENTOR.
David F. Kronquist
BY Barlow & Barlow
ATTORNEYS.

Patented Jan. 5, 1937

2,066,982

UNITED STATES PATENT OFFICE 2,066,982

REAR VISION MIRROR

David F. Kronquist, Seekonk, Mass., assignor of one-half to Ralph S. Bradley, Seekonk, Mass.

Application October 11, 1934, Serial No. 747,848

5 Claims. (Cl. 88—98)

This invention relates to a rear vision mirror for motor vehicles; and has for one of its objects the provision of a rear vision mirror which will be so mounted that the occupant of the vehicle cannot strike his head on the mirror.

Another object of the invention is the provision of a mirror sunken in a casing which may be readily applied to the framework about the windshield, and the mirror will be adjustable in the recess or that portion of the casing member in which it is sunken.

Another object of the invention is the provision of a sunken mirror construction having an actuating mechanism for the mirror, which is of such construction that the mirror may be swung about two different axes at right angles to each other by a single operating handle.

Another object of the invention is the provision of mirror construction having a simple and yet effective adjustment mechanism which may be easily and quickly manipulated to suit the convenience of different drivers.

Another object of the invention is the provision of a sunken mirror construction having an adjustment so located that a corner or edge of the mirror will not protrude any substantial distance beyond the sunken portion in which it is mounted even though the adjustment is such that there is considerable angularity of the mirror.

Another object of the invention is the provision of a mirror construction of the character described having friction means to maintain the mirror in substantially the position to which it is adjusted.

Another object of the invention is the provision of a mirror construction of the character described having a single handle for accomplishing all needed adjustment of the mirror and to support the handle with respect to the mirror so that the same may be positioned at different angles yet with the handle out of the way and not liable to be engaged by the head of an occupant moving about in the vehicle.

With these and other objects in view, the invention consists of certain novel features of construction, as will be more fully described, and particularly pointed out in the appended claims.

In the accompanying drawing:

Fig. 1 is a perspective view of the unit ready for mounting in the vehicle;

Fig. 2 is a sectional view through the mirror mounting post;

Fig. 3 is a perspective view of the unit with the casing omitted and looking at the rear of the mirror;

Fig. 4 is a perspective view looking at the inside of a motor vehicle and illustrating the position of the mounting in the framework of the windshield thereof.

In the use of rear vision mirrors in automobiles particularly closed automobiles, it is frequently experienced that the head of an occupant will strike against the corner of the rear vision mirror or some other part thereof, which throws the mirror out of adjustment and is extremely uncomfortable and dangerous should a part of the glass become broken and lodge in the head or other portion of the body of the one striking the mirror, and in order that this undesirable result may be eliminated and yet a convenient adjustment provided, I have formed a casing which will be sunken into the framework about the windshield in the usual location of a rear vision mirror and use this casing for mounting the mirror therein so that it is sunken and out of the path of movement of an occupant of the vehicle, and I have arranged an adjustment so located with reference to the general extent of the mirror that the mirror may be adjusted to considerable angularity without protruding the mirror to any substantial extent from the sunken casing so that liability of being engaged by the occupant of the vehicle is substantially eliminated, and the adjustment which I have provided enables me to adjust the mirror to any desired location by engagement with a single handle, which may be utilized for accomplishing all the adjustment which is desired; and the following is a more detailed description of the present embodiment of this invention, illustrating the preferred means by which these advantageous results may be accomplished:

With reference to the drawing, 10 designates generally a motor vehicle having a windshield 11 mounted in a frame 12 extending about and supporting the same. This frame 12 is provided with a recess 13 to receive a box-like casing 14 having a top wall 15, a back wall 16 and a bottom wall 17, which walls are provided with a flange 18 to extend over the surface of the framework 12 and be secured thereto by means of screws 19 passing through openings 20 in the flange.

An opening 21 is provided in the top wall 15 which receives a post consisting of a cylindrical threaded portion 22 and a portion 23 rectangular in cross section which prevents the post from being pulled outwardly through the opening 21. Just outside of the top wall 15 a spring washer 24 encircles the post and is engaged by a nut 25 screwed down on the threaded portion 22 of the post and suitably locked in position by a pin 26. This post may be turned in opening 21 to pivotally move the mirror about a vertical axis.

The mirror is designated 27 and is held in a sheet metal clamp 28 consisting of two parts with gripping outer edges engaging the glass and with the inner edges bound together by bolts 29 extending through the flange portions 30 thereof. From one portion of the clamp, arms 31 are cut and raised to extend along opposite sides of the post and be pivotally mounted upon the rectangular portion 23 of the post by means of a pivot pin 32 which may be secured by a spring washer and nut in place so as to cause the arms to firmly frictionally engage the post. At the outer ends of the arms a link 33 is pivoted by means of a pin 34 which link connects these ends of the arms with a lever 35 pivoted by means of a pin 36 in a slot 37 in the post. The handle portion 38 of this lever may be swung upwardly or downwardly to swing the mirror about its pivotal connection 32 to the rectangular portion of the post while a movement of the handle 38 from one side to the other will swing the post about its axis in the casing, thus securing an angularity of adjustment of the mirror in a plane at right angles to the post.

I mount the clamp 28 at one end of the mirror preferably the end at the right hand side looking forward from the driver's seat, and by reason of the mounting at one end I may swing the opposite end through a considerable range without projecting the edge 39 of the mounted end of the mirror outwardly from the casing. The handle which I utilize for operating the mirror is just beneath the inner surface of the top of a closed vehicle such as is illustrated in Figure 4, although the top is there omitted in order to better illustrate the position of the mirror in the frame. By this arrangement the mirror is sunken or in a position where the head will not strike the same when one is moving about in the vehicle and yet the mirror may be very easily adjusted and by reason of the friction washer be maintained in the position which is desired for best rear view vision.

The foregoing description is directed solely towards the construction illustrated, but I desire it to be understood that I reserve the privilege of resorting to all the mechanical changes to which the device is suceptible, the invention being defined and limited only by the terms of the appended claims.

I claim:

1. A rear vision mirror comprising, a boxlike casing having top, bottom, two sides and a back wall, said top, bottom and side walls being provided with a flange arranged to extend over the surface of a framework for securing the casing thereto, a post swivelly mounted in the top wall of said casing and having a head portion disposed within the interior of the casing and an outer slotted end portion, a mirror in said casing pivotally mounted on the head portion of said post to swing on an axis at right angles to the axis thereof, a lever pivoted in the slot at the outer end of said post to turn the post, and link connections from said lever to said mirror and responsive to the pivotal movements of said lever to swing the mirror on its pivot on said post for adjusting said mirror substantially wholly within the casing.

2. A rear vision mirror comprising a casing having a top wall and an open side, a post perpendicular to said top wall and swivelly mounted therein and extending into said casing, a mirror in said casing pivoted on said post for movement about an axis at right angles to the axis of said post, a lever outside of said casing to rotate said post and mirror together as a unit for adjusting said mirror relative to the casing about the axis of said post, said lever being pivotally mounted on said post for movement towards and from said casing, and a toggle member extending between and pivotally connected to said lever and said mirror for adjusting the latter about a horizontal axis.

3. A rear vision mirror comprising a support having a top wall and an open side, a post swivelly mounted in said top wall to turn about a vertical axis and extending above and below said wall, a rear vision mirror pivotally mounted on the lower extended portion of said post for movement about an axis at right angles to the axis of said post, a single lever disposed outside of and above said support for turning said post and pivotally mounted thereon for movement towards and from said support, and link means interposed between and pivotally connected to said lever and said mirror to swing the latter on its pivot relative to said post in response to the pivotal movement of said lever on the post.

4. A rear vision mirror comprising a casing having a top wall and an open side, a post swively mounted in said top wall to turn about a vertical axis and extending within said casing, a mirror in said casing, a clamp mounted at one end of the mirror and pivotally mounted on said post for movement about an axis at right angles to the axis of said post, a single lever outside of said casing to turn said post and pivotally mounted thereon for movement towards and from said casing, and link connections between and pivotally jointed to said lever and said clamp for swinging said clamp and said mirror held thereby on its pivot relative to said post in response to the pivotal movement of said lever on the post.

5. A rear vision mirror comprising a support having a wall member and an open side, a post swivelly mounted in said wall and extending in opposite directions therefrom, one of said post extensions being positioned opposite said open side of said support and the other extended portion of said post projecting outwardly from said wall, a rear vision mirror pivotally mounted on said side-opposed extension of said post for movement about an axis at right angles to the axis of said post, a single lever disposed outside of said wall member for turning said post and pivotally mounted on the outwardly disposed extension of the same for movement towards and from said support, and actuating means interposed between and connected to said lever and said mirror to swing the latter on its pivot relative to said post in response to the pivotal movement of said lever on the post.

DAVID F. KRONQUIST.